United States Patent
Fujiyama

[11] Patent Number: 5,333,137
[45] Date of Patent: Jul. 26, 1994

[54] CODING SYSTEM HAVING DATA CONTROLLING MECHANISM ACTIVATED WHEN ERROR IS DETECTED

[75] Inventor: Takehiko Fujiyama, Kawasaki, Japan
[73] Assignee: Fujitsu Limited, Kawasaki, Japan
[21] Appl. No.: 738,814
[22] Filed: Aug. 1, 1991
[30] Foreign Application Priority Data
  Aug. 6, 1990 [JP] Japan .................. 2-207837
[51] Int. Cl.5 .................... G06F 11/00
[52] U.S. Cl. .................... 371/8.1
[58] Field of Search .......... 371/8.1, 8.2, 68.2, 371/11.2, 68.1, 9.1, 37.1, 22.3; 370/112

[56] References Cited
U.S. PATENT DOCUMENTS
4,667,284 5/1987 Asami .................. 371/9.1
4,918,694 4/1990 Preissler .............. 371/68.1
4,996,691 2/1991 Wilcox et al. ........ 371/68.1

FOREIGN PATENT DOCUMENTS
26948 of 1987 Japan .

Primary Examiner—Robert W. Beausoliel, Jr.
Assistant Examiner—Phung M. Chung

[57] ABSTRACT

A coding system includes a first coding part, a second coding part, a switch selecting one of the first and second coding parts, a multiplexer generating a multiplexed signal from a coded signal input via the switch, and a buffer memory temporarily storing the multiplexed signal. The coding system includes a controller which generates an invalidation signal, a reset signal and the select signal when the controller is notified of the occurrence of an error and which outputs the invalidation signal, the reset signal and the select signal to the multiplexer, the buffer memory and the switch. The select signal causes the switch to select the second coding part instead of the first coding part. The invalidation signal invalidates the coded signal supplied from the first coding part to the multiplexer before the coded signal from the second coding part is input to the multiplexer via the switch. The reset signal causes the multiplexed signal stored in the buffer memory to be erased.

7 Claims, 5 Drawing Sheets

CODING SYSTEM HAVING DATA CONTROLLING MECHANISM ACTIVATED WHEN ERROR IS DETECTED

BACKGROUND OF THE INVENTION (1) Field of the Invention

The present invention generally relates to a coding system compressing video data and sending compressed video data to a transmission channel, and more particularly to such a coding system having a data controlling mechanism which is activated when an error is detected.

In a video conference system or a video phone system, it is required that the quantity of information to be transmitted be reduced. Normally, an interframe predictive coding procedure is used to compress video data to be transmitted. When a system as described above is activated, or when a scene changes, video data is compressed and transmitted by an intraframe coding procedure. This intraframe coding procedure is also activated when the coding system is notified of the occurrence of error.

(2) Description of the Prior Art

Referring to FIG. 1, a conference room (terminal) A and a conference room (terminal) B are coupled with each other via a communication channel, and communicate with each other. Information composed of video data and speech data is transmitted from the terminal A to the terminal B, so that a speaker and a display device of the terminal B are driven by the received information. Meanwhile, information composed of video data and speech data is transmitted from the terminal B to the terminal A, so that a speaker and a display device of the terminal A are driven.

If an error ERR occurs in the transmission channel from the terminal A to the terminal B, the terminal B detects the error ERR, and sends a coding mode change request signal REQ to the terminal A. This coding mode change request signal REQ is superimposed on information to be sent to the terminal A. Upon receiving the coding mode change request signal REQ, the terminal A sends intraframe-coded data D2 to the terminal B.

FIG. 2 shows a transmit/receive part of each of the terminals A and B. A video signal S1 input via a preprocessing circuit (which digitizes an analog video signal from a video camera into a digital video signal for every block) is input to an interframe coding unit 11 and an intraframe coding unit 12, both of which code the input video signal S1 by the respective coding procedures. A switch SW is provided on the output sides of the interframe coding unit 11 and the intraframe coding unit 12. Normally, the switch SW is switched to the interframe coding unit 11. Thus, video data coded by the interframe coding frame 11 passes through the switch SW and is supplied to a multiplexer 13, which multiplexes the coded video data with control data, such as auxiliary information about coefficient data with a run-length coding used. Multiplexed data generated and output by the multiplexer 13 is buffered in a buffer memory 14, and then sent to the other party's terminal via the transmission channel.

Meanwhile, multiplexed data S2 sent from the other party's terminal via the transmission channel is buffered in a buffer memory 15, and then applied to a demultiplexer 16, which separates the superimposed control data from the received multiplexed data S2. The video data and the control data are separately supplied to a decoding unit 18, which decodes the separated video data to thereby reproduce the original video data. The control data is also supplied to a coding mode controller 17. The reproduced video data is supplied to a display device and a speaker (not shown).

When the error ERR occurs and the terminal B detects the error ERR, it superimposes the coding mode change request signal REQ on part of the control data, which is normally composed of a plurality of bits. That is, the multiplexed data S2 includes the coding mode change request which is part of the control data and which is represented by one or more bits. The separated coding mode change request signal REQ is input to the coding mode controller 17, which waits for the completion of coding a frame (which corresponds to one picture plane) being processed. When it is recognized that the coding of the frame being processed is completed, the coding mode controller 17 instructs the switch SW to select the intraframe coding unit 12. Thus, the multiplexer 13 receives intraframe-coded data regarding the next frame via the switch SW, and multiplexes the received intraframe-coded data with the control data.

The interframe-coded data is obtained by encoding a difference between the current frame and the immediately previous frame, and it is thus impossible to reproduce the original picture plane (video signal) from a piece of interframe-coded data itself. Meanwhile, the intraframe-coded data is obtained by encoding data within a frame, so it is possible to reproduce the original video signal. Thus, even when an error takes place during communication, the original picture plane can be reproduced from the intraframe-coded data instead of the interframe-coded data.

One picture place consists of, for example, 525 scanning lines, and the video signal of each scanning line is digitized. During the coding procedure, one block of data amounting to 8×8 pixels is defined, and the video signal is digitized for every 6 blocks. The signal transmitted between the terminals A and B has a format in which one frame forms one picture plane. More specifically, the format is defined in, for example, the CCITT Recommendation H.261. According to this recommendation, each frame corresponding to one picture plane has a picture start code (PSC) at the beginning thereof, subsequent control bits and video data.

When the coding mode change request REQ is received, the switch SW is switched to the intraframe coding unit 12 from the interframe coding unit 11. At this time, normally, the interframe-coded data amounting to one or two frames remains in the buffer memory 14. Thus, the intraframe-coded data cannot be sent to the destination terminal until the interframe-coded data is completely read out from the buffer memory 14. Further, although not shown, the multiplexer 13 has internal buffers. Thus, it is necessary for data in the internal buffers to be completely read out therefrom before the intraframe-coded data is sent to the destination terminal. Moreover, the switch SW is switched to the intraframe coding unit 12 after the interframe coding procedure on the frame being processed is completed, so that the interframe-coded data is continuously output to the destination terminal before the switch SW is switched, although the destination terminal has already sent the coding mode change request signal REQ to the source terminal. Thus, it is impossible to send the intraframe-coded data to the destination terminal immediately after the switch SW is switched, so it takes a long time for the destination terminal to receive the intraframe-coded data and reproduce the normal picture planes therefrom.

SUMMARY OF THE INVENTION

It is a general object of the present invention to provide an improved coding system in which the above-mentioned disadvantages are eliminated.

A more specific object of the present invention is to provide a coding system making it possible for the destination (receive) terminal to be rapidly restored to the normal state in which the original video signal is correctly reproduced when an error occurs during communication.

The above-mentioned objects of the present invention are achieved by a coding system comprising:

first coding means for coding an input data signal by a first type coding process and for generating a first coded signal;

second coding means for coding the input data signal by a second type coding process and for generating a second coded signal;

switch means, coupled to the first coding means and the second coding means, for selecting one of the first coded signal and the second coded signal in accordance with a select signal;

multiplexer means, coupled to the switch means, for receiving a selected coded signal which corresponds to the one of the first coded signal and the second coded signal and for generating a multiplexed signal;

buffer means, coupled to the multiplexer means, for temporarily storing the multiplexed signal and for outputting the multiplexed signal to a communication channel; and control means, coupled to the switch means, the multiplexer means and the buffer means, for generating an invalidation signal, a reset signal and the select signal when the control means is notified of the occurrence of an error and for outputting the invalidation signal, the reset signal and the select signal to the multiplexer means, the buffer means and the switch means, respectively, the select signal causing the switch means to select the second coded signal instead of the first coded signal, the invalidation signal invalidating the first coded signal input to the multiplexer means before the second coded signal is input to the multiplexer means via the switch means, and the reset signal causing the multiplexed signal stored in the buffer means to be erased.

The above-mentioned objects of the present invention are also achieved by a coding system comprising:

a subtracter having a first input terminal receiving an input data signal, a second input terminal, and an output terminal via which a residual signal is output;

switch means, coupled to the subtracter, for selecting one of the input data signal and the residual signal;

quantizer means, coupled to the switch means, for quantizing a selected signal which corresponds to one of the input data signal and the residual signal and for generating a quantized signal;

dequantizer means, coupled to the quantizer means, for dequantizing the quantized signal and for generating a decoded residual signal;

an adder having a first input terminal receiving the decoded residual signal, a second input terminal, and an output terminal via which a reproduced input data signal is output;

a frame memory temporarily storing the reproduced input signal and outputting the reproduced input signal to the second input terminal of the subtracter and the second input terminal of the adder;

multiplexer means, coupled to the quantizer means, for receiving the quantized signal for generating a multiplexed signal;

buffer means, coupled to the multiplexer means, for temporarily storing the multiplexed signal and for outputting the multiplexed signal to a communication channel; and control means, coupled to the switch means, the multiplexer means and the buffer means, for generating an invalidation signal, a reset signal and the select signal when the control means is notified of the occurrence of an error and for outputting the invalidation signal, the reset signal and the select signal to the multiplexer means, the buffer means and the switch means, respectively, the select signal causing the switch means to select the second coded signal instead of the first coded signal, the invalidation signal invalidating the first coded signal input to the multiplexer means before the second coded signal is input to the multiplexer means via the switch means, and the reset signal causing the multiplexed signal stored in the buffer means to be erased.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
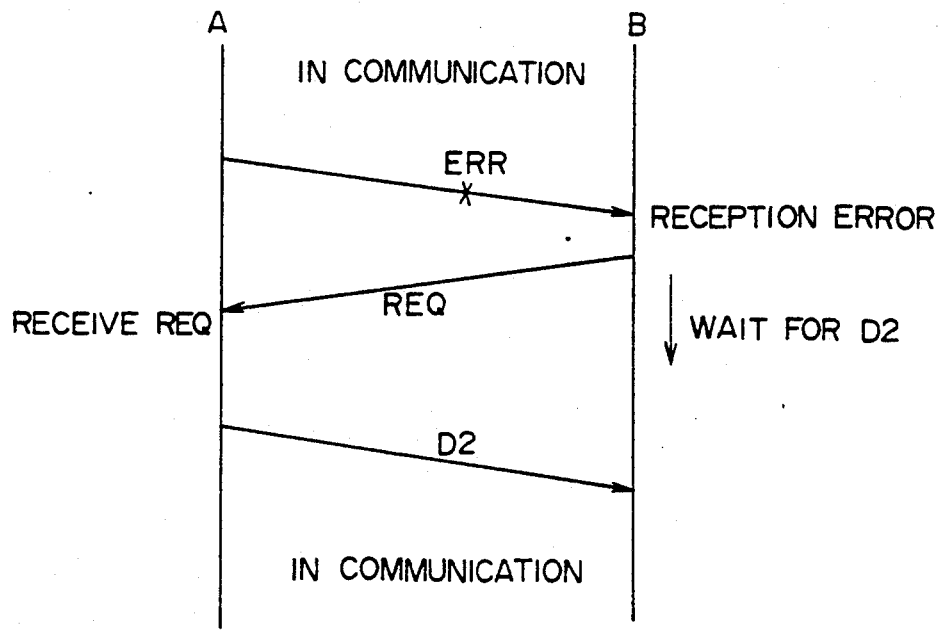
FIG. 1 is a diagram showing a communication sequence between two terminals.
Figure 2:
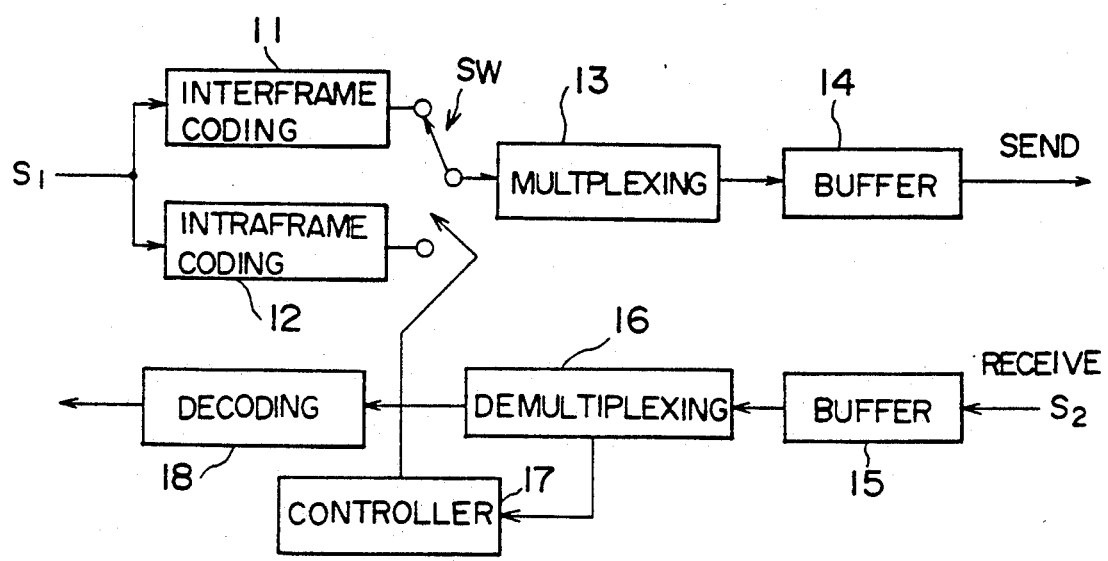
FIG. 2 is a block diagram of a conventional terminal.

A description will now be given of a preferred embodiment of the present invention with reference to FIG. 3, in which those parts which are the same as those shown in FIG. 2 are given the same reference numerals. The data S2 transmitted by the other party is buffered in the buffer memory 15, and input to the demultiplexer 16. The coding mode change request signal REQ is separated from received data by the demultiplexer 16, and applied to a controller 27. In response to the coding mode change request signal REQ, the controller 27 instructs the switch SW to select the intraframe coding unit 12. In addition, the controller 27 outputs an invalidation signal INV to the multiplexer 13, and outputs a reset signal RST to the buffer memory 14. The invalidation signal INV invalidates all data obtained before the intraframe-coded data is input and inhibits the above data from being output to the buffer memory 14. The reset signal RST causes the buffer memory 14 to erase all data which is stored therein. With this arrangement, it is not necessary to wait for the completion of outputting data stored in the buffer memory 14, so that the other party can be restored to the normal state rapidly. In addition, since all data in the multiplexer 13 is erased, the other party can be restored to the normal state rapidly.

Figure 3:
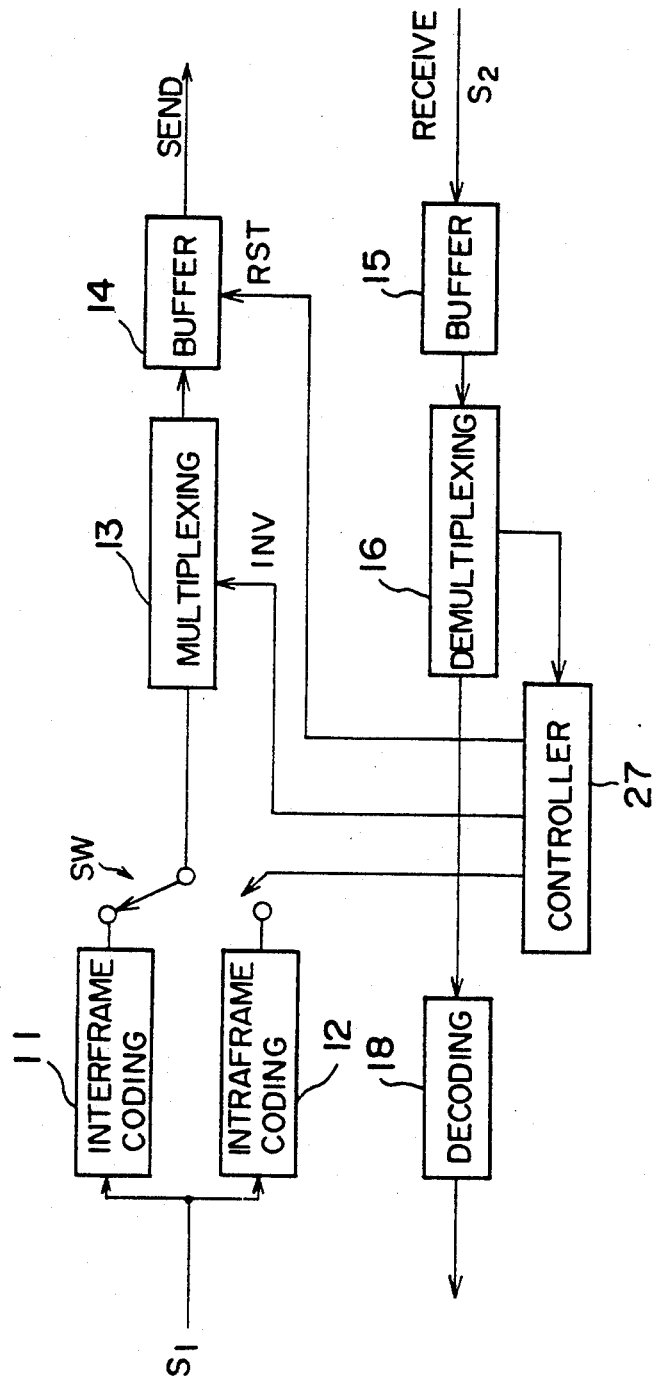
FIG. 3 is a block diagram of a preferred embodiment of thee present invention.
Figure 4:
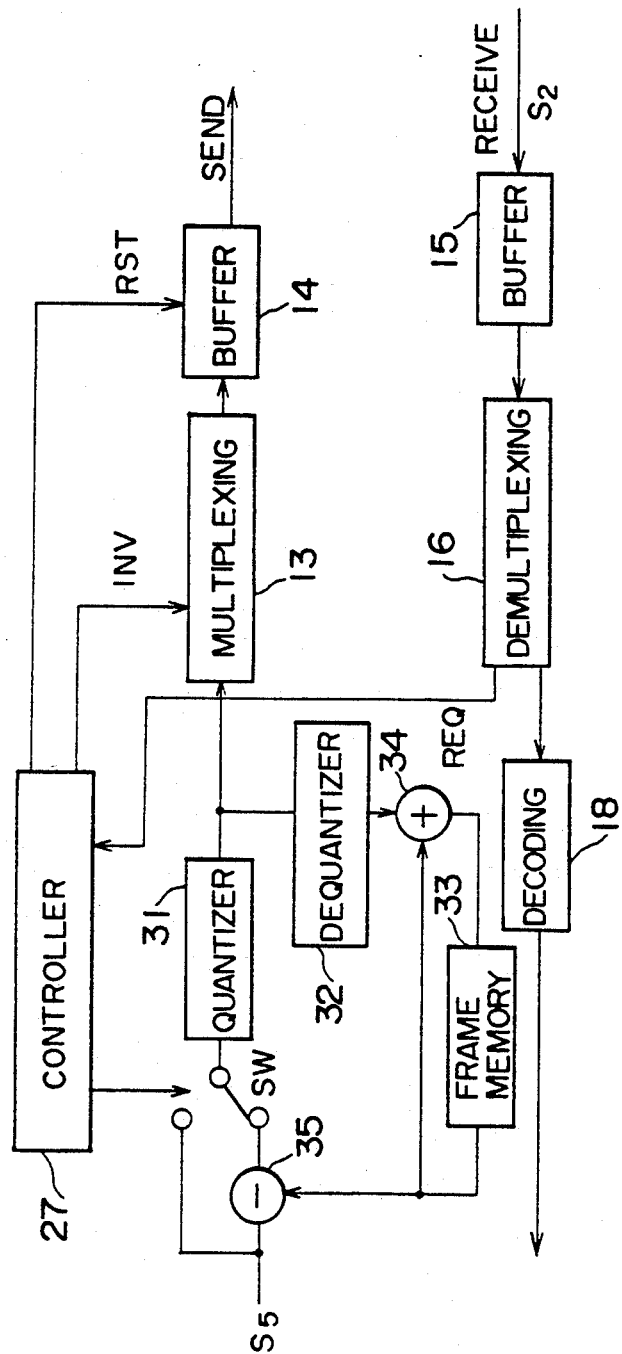
FIG. 4 is a block diagram of a variation of the configuration shown in FIG. 3.

FIG. 4 shows a variation of the structure shown in FIG. 3. In FIG. 4, those parts which are the same as those shown in FIG. 3 are given the same reference numerals. A quantizer 31 corresponds to the intraframe coding unit 12 shown in FIG. 3, and a combination of the quantizer 31, a dequantizer (reverse quantizer) 32, a frame memory 33, an adder 34 and a subtracter 35 forms an interframe predictive coding unit, which corresponds to the interframe coding unit 11 shown in FIG. 3. Normally, the switch SW selects the output of the subtracter 35. Video data S5 is input to the subtracter 35, which subtracts decoded video data read out from the frame memory 33, and a resultant residual signal is input to the quantizer 31 via the switch SW. A quantized residual signal generated and output by the quantizer 31 is output to the multiplexer 13 and the dequantizer 32. A dequantized residual signal is added to the previous frame data by the adder 34, and an added result signal is written into the frame memory 33.

When the data S2 containing the coding mode change request signal REQ is received, the demultiplexer 16 outputs the extracted request signal REQ to the controller 27. Then, the controller 27 instructs the switch SW to directly receive the video data S5. At the same time as the switch SW is instructed, the controller 27 outputs the invalidation signal INV to the multiplexer 13 and outputs the reset signal RST to the buffer memory 14. The video data passes through the switch SW and is directly applied to the quantizer 31, which carries out the intraframe coding for the directly received video data. The quantized video data (intraframe-coded data) is input to the multiplexer 13. At this time, all data (interframe-coded data) in the multiplexer 13 is erased in response to the invalidation signal INV, and all data stored in the buffer memory 14 is also erased in response to the reset signal RST. Thus, the multiplexer 13 restarts operation and executes the multiplexing procedure on the intraframe-coded data related to the frame subsequent to the frame which was being processed when the invalidation signal INV was applied to the multiplexer 13. The multiplexed data output by the multiplexer 13 is successively buffered in the buffer memory 14. It will be noted that the buffer memory 14 has been reset before it receives the intraframe-coded data.

Figure 5:
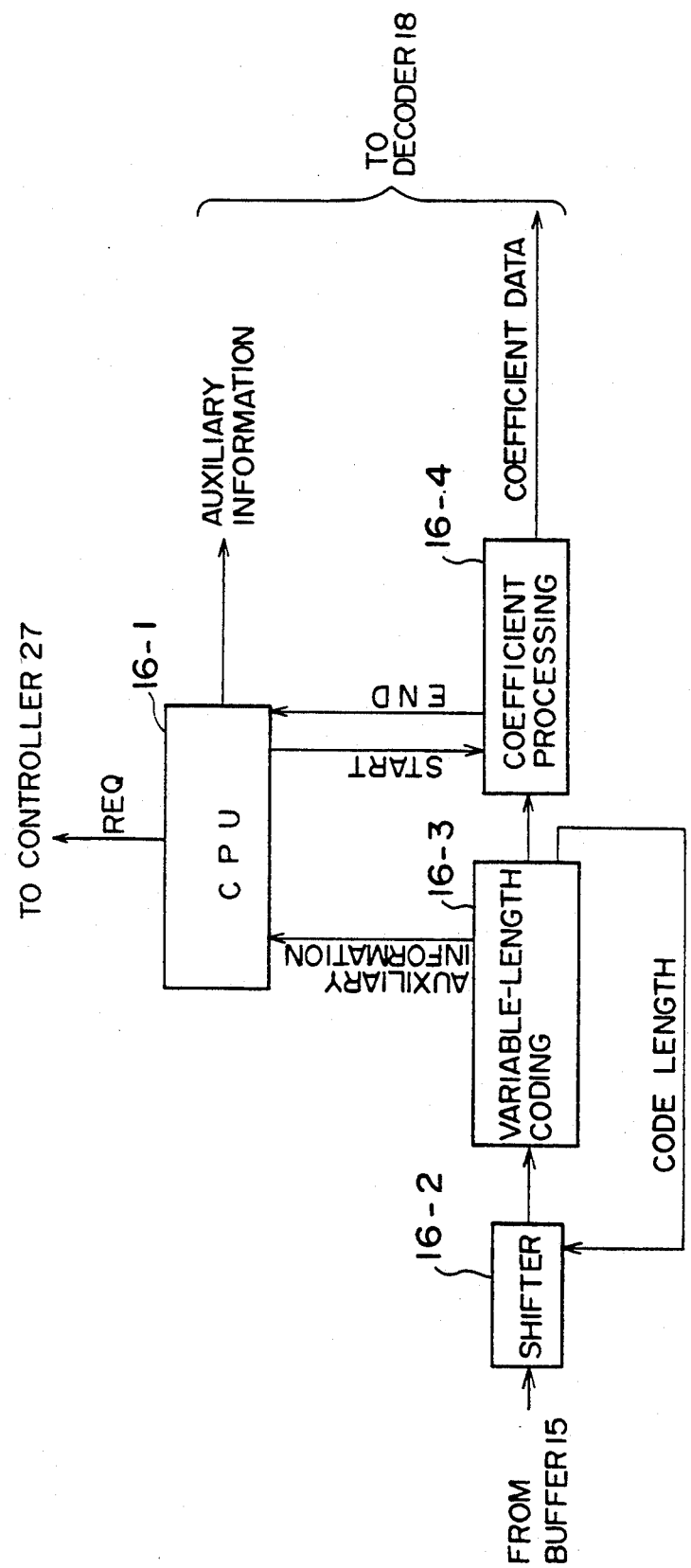
FIG. 5 is a block diagram of a demultiplexer shown in FIG. 3 or FIG. 4.

FIG. 5 shows the demultiplexer 16 shown in FIG. 3 or FIG. 4 in more detail. As shown in FIG. 5, the demultiplexer 16 is composed of a CPU (Central Processing Unit) 16-1, a shifter 16-2, a variable-length decoder 16-3 and a coefficient processing part (run-length decoder) 16-4. The received data S2 is shifted by the shifter 16-2, and input to the variable-length decoder 16-3, which generates decoded data and control data, such as auxiliary information about coefficient data and the coding mode change request signal REQ. The decoded data is then input to the coefficient processing part 16-4, which reproduces coefficient data under the control of the CPU 16-1. More specifically, the coefficient processing part 16-4 is activated in response to a start signal from the CPU 6-1, and notifies the CPU 16-1 of the completion of data processing. The CPU 16-1 outputs the auxiliary information about the coefficient data to the decoder 18 (FIG. 3 or FIG. 4) and outputs the extracted coding mode change request signal REQ to the controller 27 (FIG. 3 or FIG. 4).

Figure 6:
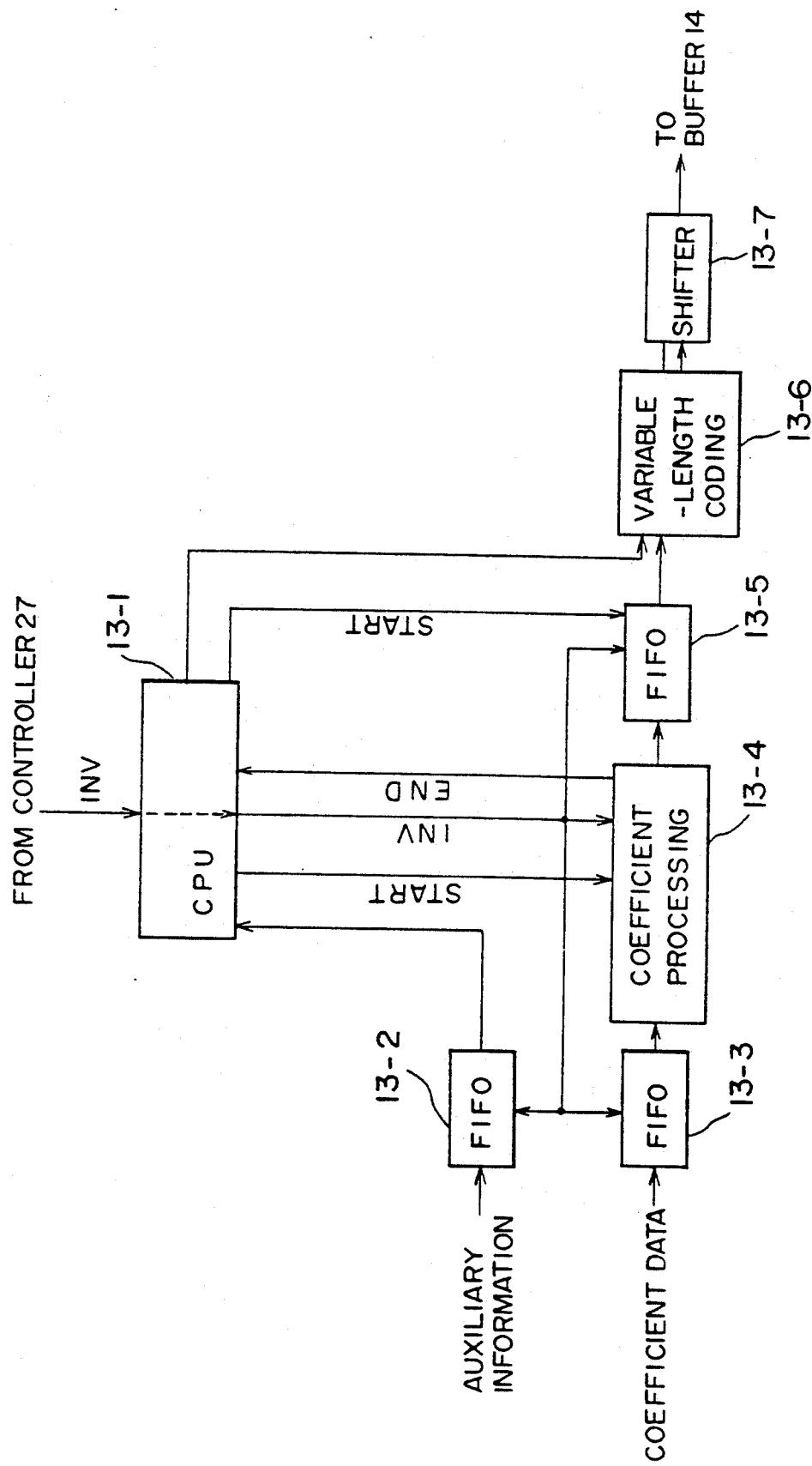
FIG. 6 is a block diagram of a multiplexer shown in FIG. 3 or FIG. 4.

FIG. 6 shows the multiplexer 13 shown in FIG. 3 or FIG. 4 in more detail. As shown in FIG. 6, the multiplexer 13 is made up of a CPU 13-1, three FIFO (First-In First--Out) memories 13--2, 13--3 and 13-5, a coefficient processing part (run-length coder) 13-4, a variable-length coder 13-6 and a shifter 13-7. The auxiliary information about the coefficient data output by the quantizer 31 is input to the CPU 13-1 via the FIFO memory 13-2, and coefficient data supplied therefrom is input to the coefficient processing part 13-4 via the FIFO memory 13-3. The coefficient processing part 13-4 encodes the coefficient data under the control of the CPU 13-1, and outputs coded data to the variable-length coder 13-6 via the FIFO memory 13-5. The coefficient processing part 13-4 is activated in response to a start signal supplied from the CPU 13-1 and notifies the CPU 13-1 of the completion of data processing. The variable-length coder 13-6 transforms, together with the auxiliary information about the coefficient data, the coded data into a variable-length code, which is output to the buffer memory 14 via the shifter 13-7. It will be noted that the FIFO memories 13-2, 13-3 and 13-5 function as buffer memories.

The CPU 31-1 receives the invalidation signal INV from the controller 27 and outputs a reset signal to the FIFO memories 13-2, 13-3 and 13-5 and the coefficient processing part 13-4. Thereby, all the data stored in these elements is erased.

The present invention is not limited to the specifically disclosed embodiments, and variations and modifications may be made without departing from the scope of the present invention.

What is claimed is:

1. A coding system comprising:

first coding means for coding an input data signal and for generating a first coded signal;

second coding means for coding the input data signal and for generating a second coded signal;

switch means, coupled to said first coding means and said second coding means, for selecting one of said first coded signal and said second coded signal in accordance with a select signal;

multiplexer means, coupled to said switch means, for receiving a selected coded signal which corresponds to said one of the first coded signal and said second coded signal and for generating a multiplexed signal;

buffer means, coupled to said multiplexer means, for temporarily storing said multiplexed signal and for outputting said multiplexed signal to a communication channel; and control means for generating an invalidation signal, a reset signal and said select signal when said control means is notified of the occurrence of an error, said control means being coupled to said switch means, said multiplexer means and said buffer means and outputting said select signal to said switch means so as to cause said switch means to select said second coded signal instead of said first coded signal said control means outputting said invalidation signal to said multiplexer means so as to invalidate said first coded signal input to said multiplexer means before said second coded signal is input to said multiplexer means via said switch means, and said control means outputting said reset signal to said buffer means so as to cause said multiplexed signal stored in said buffer means to be erased, wherein said input data signal is composed of frames;

said first coding means comprising means for coding said input data signal in a plurality of consecutive frames; and said second coding means comprising means for coding said input data signal for every frame, wherein said multiplexer means comprises:

a first buffer memory temporarily storing said selected coded signal;

processing means for transforming said selected coded signal form said first buffer memory into a predetermined coded signal;

a second buffer memory coupled to said processing means for temporarily storing said predetermined coded signal which is output, as said multiplex signal, to said buffer means; and controller means for resetting said first and second buffer memories and said processing means to a predetermined state in response to said invalidation signal.

2. A coding system as claimed in claim 1, wherein: said invalidation signal causes said selected coded signal stored in said buffer memory to be erased.

3. A coding system as claimed in claim 1, wherein said input data signal comprises video data.

4. A coding system comprising:

a subtracter having a first input terminal receiving an input data signal, a second input terminal, and an output terminal via which a residual signal is output;

switch means, coupled to said subtracter, for selecting one of said input data signal and residual signal in accordance with a select signal;

quantizer means, coupled to said switch means, for quantizing a selected signal which corresponds to one of said input data signal and said residual signal and for generating a quantized signal;

dequantizer means, coupled to said quantizer means, for dequantizing said quantized signal and for generating a decoded residual signal;

an adder coupled to said dequantizer means and having a first input terminal receiving said decoded residual signal, a second input terminal, and an output terminal via which a reproduced input data signal is output;

a frame memory coupled to said adder and said subtracter for temporarily storing said reproduced input data signal and outputting said reproduced input data signal to said second input terminal of said subtracter and said second input terminal of said adder;

multiplexer means, coupled to said quantizer means, for receiving said quantized signal for generating a multiplexed signal;

buffer means, coupled to said multiplexer means, for temporarily storing said multiplexed signal and for outputting said multiplexed signal to a communication channel; and control means, coupled to said switch means, said multiplexer means and said buffer means, for generating an invalidation signal, a reset signal and said select signal when said control means is notified of the occurrence of an error and for outputting said invalidation signal, said reset signal and said select signal to said multiplexer means, said buffer means and said switch means, respectively, said select signal causing said switch means to select a second coded signal instead of a first coded signal, said invalidation signal invalidating said first coded signal input to said multiplexer means before said second coded signal is input to said multiplexer means via said switch means, and said reset signal causing said multiplexed signal stored in said buffer means to be erased.

5. A coding system as claimed in claim 4, wherein: said multiplexer means comprises a buffer memory temporarily storing said selected coded signal; and said invalidation signal causes said selected coded signal stored in said buffer memory to be erased.

6. A coding system as claimed in claim 4, wherein said multiplexer means comprises:

a first buffer memory temporarily storing said selected coded signal;

processing means for transforming said selected coded signal from said first buffer memory into a predetermined coded signal;

a second buffer memory coupled to said processing means for temporarily storing said predetermined coded signal which is output, as said multiplexed signal, to said buffer means; and controller means for resetting said first and second buffer memories and said processing means to a predetermined state in response to said invalidation signal.

7. A coding system as claimed in claim 4, wherein said input data signal comprises video data.

* * * * *